(12) United States Patent
Shimoda et al.

(10) Patent No.: US 10,435,100 B2
(45) Date of Patent: Oct. 8, 2019

(54) BICYCLE COMPONENT

(71) Applicant: Shimano Inc., Sakai, Osaka (JP)

(72) Inventors: Makoto Shimoda, Osaka (JP);
Yoshitaka Nose, Osaka (JP); Yuya Yoneda, Osaka (JP); Taihei Nishihara, Osaka (JP)

(73) Assignee: Shimano Inc., Osaka (JP)

( * ) Notice: Subject to any disclaimer, the term of this patent is extended or adjusted under 35 U.S.C. 154(b) by 244 days.

(21) Appl. No.: 15/642,597

(22) Filed: Jul. 6, 2017

(65) Prior Publication Data

US 2018/0009496 A1 Jan. 11, 2018

(30) Foreign Application Priority Data

Jul. 7, 2016 (JP) .................. 2016-135511

(51) Int. Cl.
*H01M 4/02* (2006.01)
*B62J 11/00* (2006.01)
*B60R 16/04* (2006.01)
*B62J 99/00* (2009.01)
*H01M 2/04* (2006.01)
*H01M 2/10* (2006.01)
*B62M 6/90* (2010.01)
*B62K 19/30* (2006.01)

(52) U.S. Cl.
CPC .............. *B62J 11/00* (2013.01); *B60R 16/04* (2013.01); *B62J 99/00* (2013.01); *B62K 19/30* (2013.01); *B62M 6/90* (2013.01); *H01M 2/0404* (2013.01); *H01M 2/1005* (2013.01); *H01M 2/1077* (2013.01); *B62J 2099/004* (2013.01); *B62K 2208/00* (2013.01); *H01M 2220/20* (2013.01)

(58) Field of Classification Search
CPC ........................................................ H01M 4/02
See application file for complete search history.

(56) References Cited

U.S. PATENT DOCUMENTS

2004/0013938 A1* 1/2004 Murashige .......... H01M 2/1055
429/96

FOREIGN PATENT DOCUMENTS

| JP | 9-161749 A | 6/1997 |
|---|---|---|
| JP | 2002-104266 A | 4/2002 |
| JP | 3682734 B2 | 8/2005 |

* cited by examiner

*Primary Examiner* — Jacob B Marks
(74) *Attorney, Agent, or Firm* — Global IP Counselors, LLP (57) ABSTRACT

A bicycle component is provided with a base including a recess, a cover, a protected member that is at least partially arranged in the recess, and an engagement portion. The cover is configured to close the recess. The protected member is at least partially arranged in the recess. The engagement portion is configured separately from the cover and the protected member. The engagement portion is arranged in the recess and engages the cover that covers the recess.

15 Claims, 4 Drawing Sheets

BICYCLE COMPONENT

CROSS-REFERENCE TO RELATED APPLICATIONS

This application claims priority to Japanese Patent Application No. 2016-135511, filed on Jul. 7, 2016. The entire disclosure of Japanese Patent Application No. 2016-135511 is hereby incorporated herein by reference.

BACKGROUND

Field of the Invention

The present invention relates to a bicycle component.

Background Information

Japanese Laid-Open Patent Publication No. 2002-104266 (Patent document 1) discloses a bicycle battery case that includes a connector, which is arranged in a recess of the case, and a cover, which may be attached to the recess. The cover is attached to the recess to cover the connector.

It is preferred that separation of the cover from the recess due to vibration be limited in order to protect a protected member such as a connector.

SUMMARY

In accordance with a first aspect of the present invention, a bicycle component basically includes a base, a cover, a protected member and an engagement portion. The base includes a recess. The cover selectively covers the recess. The protected member is at least partially arranged in the recess. An engagement portion is configured separately from the cover and the protected member. The engagement portion is provided in the recess and engages the cover that covers the recess. With the bicycle component according to the first aspect, the cover covering the recess is engaged with the engagement portion in the recess. This limits separation of the cover from the recess even when the bicycle component vibrates. The engagement portion is configured separately from the base and the protected member. This facilitates manufacturing as compared with when the engagement portion is formed integrally with the base. The engagement portion is configured separately from the protected member. Thus, the opening and closing of the cover does not apply load to the protected member. This allows the load applied to the protected member to be reduced.

In accordance with a second aspect of the invention, the bicycle component according to the first aspect is configured so that the protected member is an electric connector or a key slot. With the bicycle component according to the second aspect, the cover covers the electric connector or the key slot. This limits the entrance of a foreign matter into the electric connector or the key slot.

In accordance with a third aspect of the invention, the bicycle component according to the first or second aspect is configured so that the engagement portion is removably fixed to the base. With the bicycle component according to the third aspect, the engagement portion is fixed in a removable manner to the base. This allows the engagement portion to be replaced.

In accordance with a fourth aspect of the invention, the bicycle component according to any one of the preceding aspects further includes a coupling portion to which the cover is movably coupled. The coupling portion is attached to the base in the recess. With the bicycle component according to the fourth aspect, the cover is coupled to the coupling portion. Thus, the cover does not become easily lost. The coupling portion is attached to the recess. Thus, the cover also covers the coupling portion.

In accordance with a fifth aspect of the invention, the bicycle component according to the fourth aspect is configured so that the base includes a bottom surface, a step and an opening at least partially defining the recess. The bottom surface of the recess has a smaller area than the opening of the recess. The coupling portion is attached to the step. With the bicycle component according to the fifth aspect, attachment of the coupling portion to the step facilitates positioning of the coupling portion in the depth-wise direction of the recess.

In accordance with a sixth aspect of the invention, the bicycle component according to the fourth or fifth aspect is configured so that the coupling portion is formed integrally with the engagement portion as a one-piece member. With the bicycle component according to the sixth aspect, the coupling portion is formed integrally with the engagement portion. Thus, manufacturing is facilitated in comparison with when the coupling portion and the engagement portion are formed separately. Further, the coupling portion can be replaced together with the engagement portion.

In accordance with a seventh aspect of the invention, the bicycle component according to any one of the fourth to sixth aspects is configured so that the cover is non-removably coupled to the coupling portion. With the bicycle component according to the seventh aspect, since the cover is coupled in a non-removable manner to the coupling portion, the cover is not easily lost.

In accordance with an eighth aspect of the invention, the bicycle component according to any one of the fourth to seventh aspects further includes a fastener that fixes the coupling portion to the base in a removable manner. With the bicycle component according to the eighth aspect, the fastener removably fixes the coupling portion. This facilitates the attachment and removal of the coupling portion to and from the base.

In accordance with a ninth aspect of the invention, the bicycle component according to the eighth aspect is configured so that the fastener includes a screw. With the bicycle component according to the ninth aspect, the screw facilitates the attachment and removal of the coupling portion, while increasing the fixing strength of the coupling portion.

In accordance with a tenth aspect of the invention, the bicycle component according to any one of the preceding aspects is configured so that the cover includes a first protrusion that engages the engagement portion. With the bicycle component according to the tenth aspect, the cover includes the first protrusion. This engages the cover and the engagement portion in a suitable manner.

In accordance with an eleventh aspect of the invention, the bicycle component according to the tenth aspect is configured so that the cover includes a first portion that covers an opening of the recess and a second portion that extends in a depth-wise direction of the recess. The first protrusion is provided on the second portion. With the bicycle component according to the eleventh aspect, the second portion includes the first protrusion. This increases options for where the engagement portion can be located in the recess.

In accordance with a twelfth aspect of the invention, the bicycle component according to the tenth or eleventh aspect is configured so that the engagement portion includes a first groove that engages the first protrusion. With the bicycle component according to the twelfth aspect, the engagement portion includes the first groove. This engages the cover and the engagement portion in a suitable manner.

In accordance with a thirteenth aspect of the invention, the bicycle component according to any one of the preceding aspects is configured so that the cover includes a second groove that engages the engagement portion. With the bicycle component according to the thirteenth aspect, the cover includes the second groove. This engages the cover and the engagement portion in a suitable manner.

In accordance with a fourteenth aspect of the invention, the bicycle component according to any one of the preceding aspects further includes a housing that at least a portion of the base. With the bicycle component according to the fourteenth aspect, the cover protects a protected portion that is arranged in the housing.

In accordance with a fifteenth aspect of the invention, the bicycle component according to the fourteenth aspect further includes a battery cell accommodated in the housing. With the bicycle component according to the fifteenth aspect, the housing accommodates the battery cell. Thus, the electric component can be configured as a battery unit.

Separation of the bicycle component from the recess is limited even if the bicycle component vibrates.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
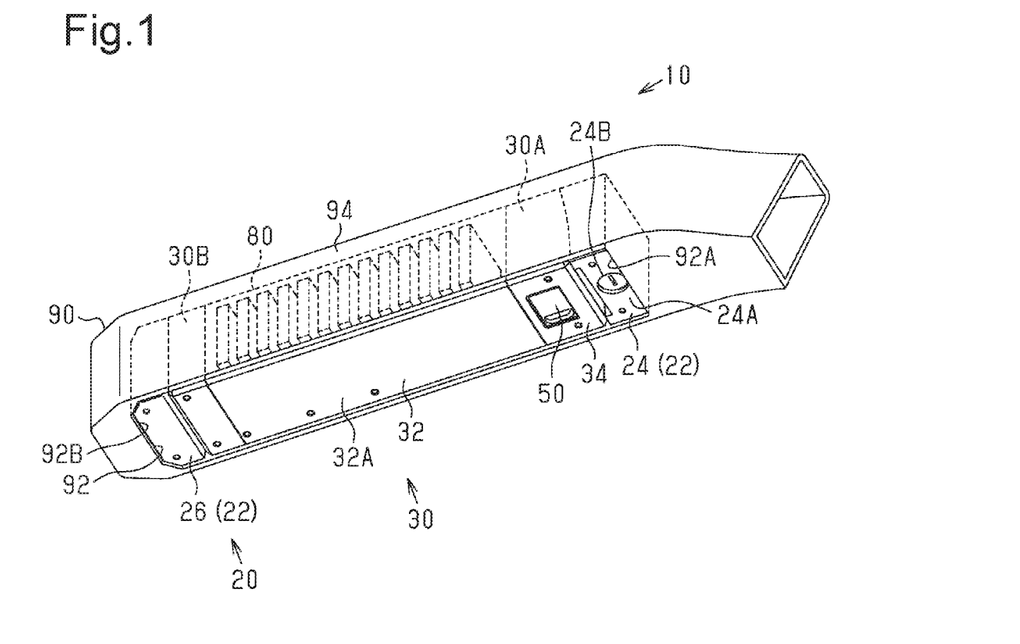
FIG. 1 is a perspective view of a bicycle component and a receptacle in accordance with one embodiment.

As shown in FIG. 1, a bicycle component 10 is configured to allow for arrangement in a receptacle 90 of a bicycle. One example of the receptacle 90 is a frame of the bicycle. The receptacle 90 includes an accommodation recessed portion 92. The bicycle component 10 includes a base 34, a cover 50, a protected member P (refer to FIG. 3) and a pair of engagement portions 70 (refer to FIG. 3). The base 34 includes a recess 40 (refer to FIG. 3). The cover 50 is configured to selectively cover the recess 40. The protected member P is at least partially arranged in the recess 40. The engagement portions 70 are separate pieces from the base 34 and the protected member P. The cover 50 and the engagement portions 70 form an engagement structure 74 (refer to FIG. 6). The engagement portions 70 are arranged in the recess 40. The engagement portions 70 engage the cover 50 in a state in which the cover 50 is covering the recess 40. Engagement of the cover 50 with the engagement portions 70 holds the cover 50 in a state covering the recess 40. The bicycle component 10 further includes a coupling portion 60 (refer to FIG. 3). The coupling portion 60 is arranged in the recess 40. The engagement portions 70 are separate pieces from the base 34 and the protected member P. The cover 50 is movably coupled to the coupling portion 60. The cover 50 is coupled in a removable manner to the coupling portion 60. The bicycle component 10 further includes a fastener 62 (refer to FIG. 3). The fastener 62 removably fixes the coupling portion 60 to the base 34 in a removable manner.

The bicycle component 10 includes a battery component 20. The battery component 20 includes a battery holder 22 and a battery unit 30. In one example, the battery unit 30 includes the base 34, the cover 50, the protected member P, the engagement portions 70, the coupling portion 60 and the fastener 62. The longitudinal direction and the lateral direction are based on the shape of the battery unit 30. The battery unit 30 further includes a housing 32 and a plurality of battery cells 80. The battery unit 30 includes a first end 30A and a second end 30B. The first end 30A and the second end 30B are spaced apart in the longitudinal direction of the battery unit 30. The base 34 forms part of the housing 32. The battery cells 80 are accommodated in the housing 32. The housing 32 includes an exposed surface 32A. In a state in which the battery unit 30 is coupled to the battery holder 22, the exposed surface 32A is exposed from an opening of the accommodation recessed portion 92.

The battery holder 22 includes a first battery holder 24 and a second battery holder 26. The battery holders 24 and 26 are coupled to the accommodation recessed portion 92. The first battery holder 24 is arranged in the accommodation recessed portion 92 at a first end 92A in the longitudinal direction of the accommodation recessed portion 92. The first battery holder 24 is configured to hold the first end 30A of the battery unit 30. The second battery holder 26 is arranged in the accommodation recessed portion 92 at a second end 92B in the longitudinal direction of the accommodation recessed portion 92. The second battery holder 26 is configured to hold the second end 30B of the battery unit 30.

An accommodation region 94 is provided in the accommodation recessed portion 92. The accommodation region 94 allows for the arrangement of the battery component 20. The accommodation region 94 lies between the first battery holder 24 and the second battery holder 26. The arrangement of the battery component 20 between the first battery holder 24 and the second battery holder 26 holds the battery component 20 with the holders 24 and 26. In this state, the battery unit 30 is electrically connected via the battery holder 22 to an electric component (not shown) of the bicycle. This arrangement supplies the electric component with power from the battery unit 30.

The first battery holder 24 includes a catch (not shown), a lock mechanism 24A and a key slot 24B. The catch is configured to be projectable from a side wall of the first battery holder 24 into the accommodation region 94. The catch is movable between a first position where the catch is engageable with the battery unit 30 that is arranged in the accommodation region 94 and a second position where the catch is separated from the battery unit 30. A biasing member (not shown) biases the catch toward the first position. The lock mechanism 24A is configured to move the catch. The key slot 24B is configured to allow for the insertion of a key (not shown) to operate the lock mechanism 24A. In a state in which the key is inserted into the key slot 24B, a first operation is performed to move the catch from the first position to the second position. This disengages the catch from the battery unit 30. Removal of the key from the key slot 24B moves the catch from the second position to the first position. The first operation includes, for example, an operation that turns the key or an operation that pushes the key with the key in a turned state.

Figure 2:
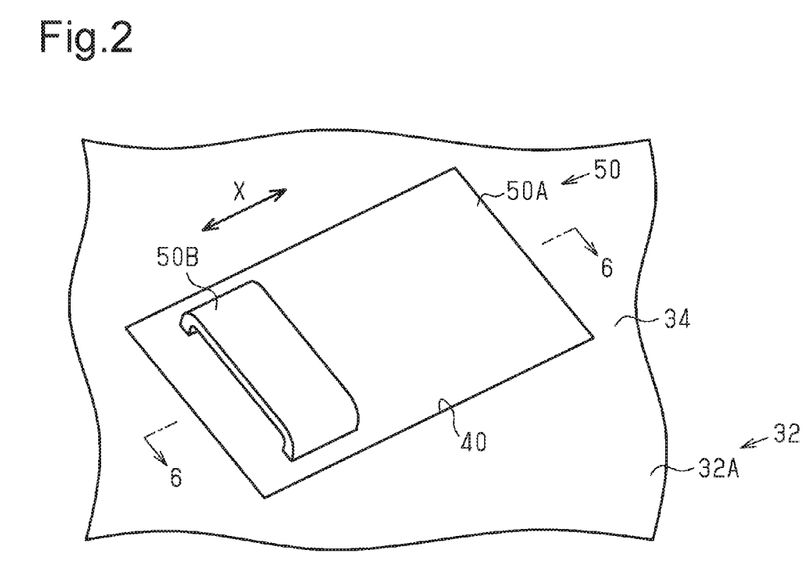
FIG. 2 is an enlarged perspective view of a portion of the bicycle component around a cover that is shown in FIG. 1 in which the cover in a closed state.

As shown in FIG. 2, the cover 50 covers the recess 40. The cover 50 is shaped in conformance with the recess 40. In one example, in a state in which the cover 50 is attached to the base 34 in the recess 40, the portion of the cover 50 exposed to the outside is rectangular. The cover 50 can have any shape. In a state in which the cover 50 is attached to the base 34 in the recess 40, the portion of the cover 50 exposed to the outside can have the shape of a square, circle, or an ellipse. The material from which the cover 50 is formed includes, for example, a resin or a metal. The cover 50 includes a first surface 50A. In a state in which the cover 50 is attached to the base 34 in the recess 40, the first surface 50A is substantially flush with the exposed surface 32A of the housing 32. The first surface 50A includes a tab 50B. The tab 50B can have any shape as long as the user can hold the tab 50B to remove the cover 50 from the recess 40. It is preferred that the tab 50B be arranged on the first surface 50A near one end in a first direction X.

Figure 3:
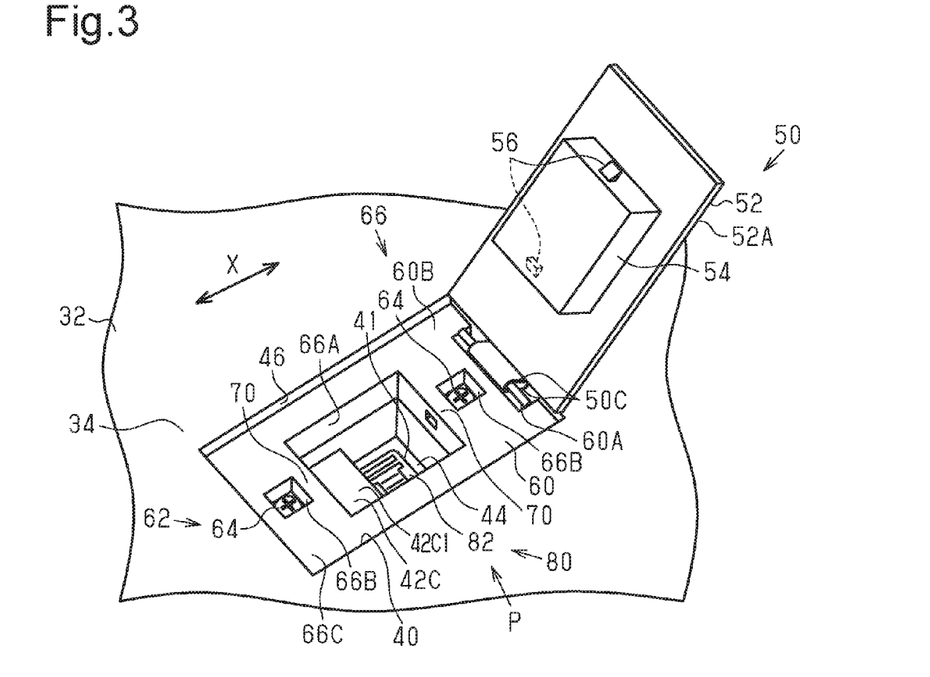
FIG. 3 is a perspective view of the portion of the bicycle component around the cover as illustrated in FIG. 2 in which the cover in an open state.
Figure 4:
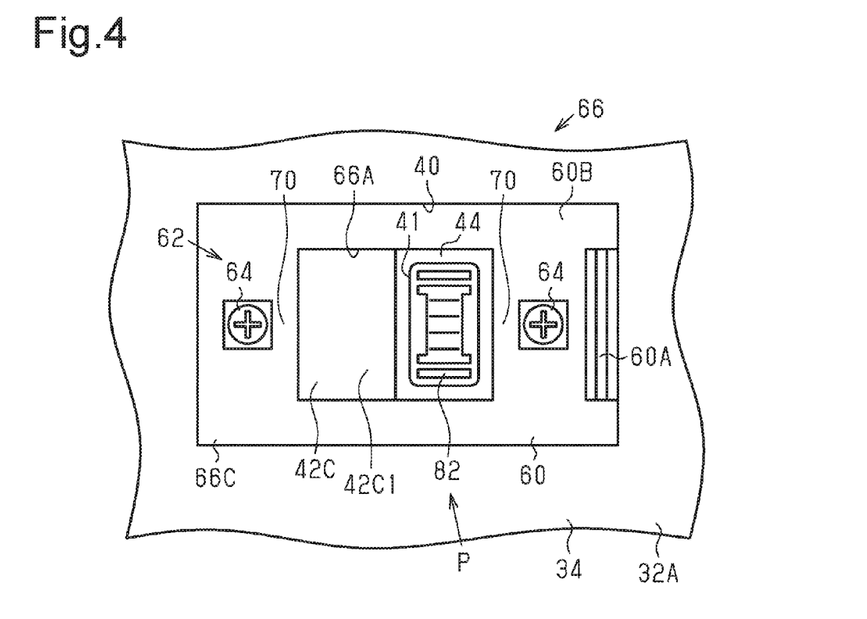
FIG. 4 is a front view of the portion of the bicycle component around the cover as illustrated in FIGS. 2 and 3 in a state in which the cover has been removed.

As shown in FIGS. 3 and 4, the base 34 includes an opening 46 in the exposed surface 32A. The opening 46 partially defines the recess 40. One example of the protected member P is an electric connector 82. The base 34 includes a bottom surface 44 that partially defines the recess 40. The bottom surface 44 includes a hole 41 that is in communication with the interior (not shown) of the housing 32. A portion of the electric connector 82 is arranged in the recess 40, and the remaining portion of the electric connector 82 is arranged in the interior of the housing 32. The electric connector 82 can be entirely arranged in the recess 40. The battery cells 80 can be electrically connected to the electric connector 82 by a cable (not shown). It is preferred that the battery cells 80 be electrically connected to the electric connector 82 through an electronic circuit that controls the charging and discharging of the battery cells 80. A charging plug can be connected to the electric connector 82 to charge the battery cells 80 via the electric connector 82.

The material from which the engagement portions 70 are formed includes, for example, at least one of a resin and a metal. The material from which the coupling portion 60 is formed includes, for example, at least one of a resin and a metal. The engagement portions 70 and the coupling portion 60 are formed integrally with one another. The engagement portions 70 and the coupling portion 60, which are formed integrally with one another, define a retainer 66. The retainer 66 is separate from the base 34 and the protected member P. The coupling portion 60 includes a coupling pin 60A and a coupling base 60B. The coupling pin 60A includes two axial ends that are each held by the coupling base 60B. In the present embodiment, the coupling base 60B and the engagement portions 70 are molded integrally from resin. In the present embodiment, the coupling pin 60A is formed from a metal. Further, the two axial ends of the coupling pin 60A are embed in and fixed to the coupling base 60B in a non-removable manner. The coupling base 60B and the engagement portions 70 can be molded integrally with one another from a metal. The coupling pin 60A can be formed from a resin. The coupling pin 60A can be coupled in a removable manner to the coupling base 60B. The retainer 66 is frame-shaped. The retainer 66 is generally box-shaped. A through hole 66A extends through a central portion of the retainer 66. The coupling pin 60A is arranged at one end of the retainer 66. The retainer 66 is not limited in shape and can be L-shaped or I-shaped. In the present embodiment, the portion of the retainer 66 excluding the coupling pin 60A defines the coupling base 60B.

The fastener 62 removably fixes the coupling portion 60 to the base 34 in a removable manner. The engagement portions 70 are fixed in a removable manner to the base 34. Further, the fastener 62 removably fixes the retainer 66 to the base 34 in a removable manner. In the example shown in FIG. 3, the fastener 62 includes a pair of screws 64. The screws 64 removably fix the retainer 66 to the base 34 in a removable manner. The retainer 66 includes holes 66B that receive the screws 64. The holes 66B are located at opposite sides of the through hole 66A. The holes 66B each include a large-diameter portion and a small-diameter portion. The head of the corresponding screw 64 is arranged in the large-diameter portion of the holes 66B. The threaded shank of the corresponding screw 64 is arranged in the small-diameter portion of the holes 66B. In the retainer 66, at least a portion of the surface 66C opposing the opening 46 of the recess 40 is configured to contact the cover 50 in a state in which the cover 50 is attached to the base 34 to cover the recess 40. It is preferred that the large-diameter portion of each of the holes 66B be large enough to accommodate the entire head of the corresponding screw 64. The large diameter portion can be omitted from each hole 66B. In this case, the head of each corresponding screw 64 can project out of the surface 66C of the retainer 66. The fastener 62 can be a snap-fit fastener or a hook-and-loop fastener. The fastener 62 can have any structure as long as it is capable of fixing an object in a removable manner. At least either one of the coupling portion 60 and the engagement portions 70 can be removably fixed to the base 34 in a removable manner. In this case, at least either one of the coupling portion 60 and the engagement portions 70 can be fixed to the base 34, for example, by using an adhesive or rivets or by performing welding.

Figure 5:
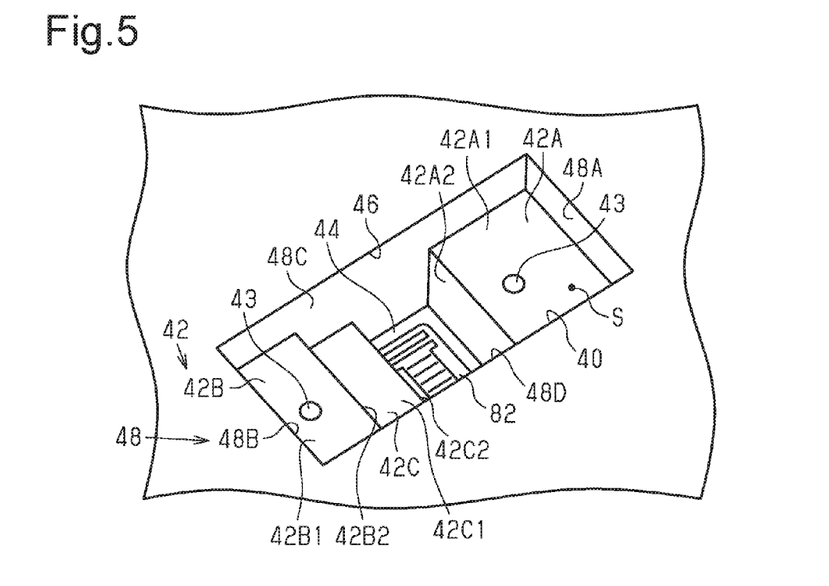
FIG. 5 is a perspective view of the portion of the bicycle component around the cover in a state in which a retainer is removed from the portion of the bicycle component around the cover.

As shown in FIG. 5, the recess 40 includes a plurality of steps 42 and the bottom surface 44. The recess 40 further includes a plurality of side wall surfaces 48. The side wall surfaces 48 extend from the opening 46 of the recess 40 in the depth-wise direction of the recess 40. In the present embodiment, the opening 46 of the recess 40 is rectangular. The shape of the first surface 50A of the cover 50 (refer to FIG. 2) is similar to the shape of the opening 46 of the recess 40. The first surface 50A of the cover 50 is shaped to be slightly smaller than the opening 46 of the recess 40. The side wall surfaces 48 include a first side wall surface 48A, a second side wall surface 48B, a third side wall surface 48C and a fourth side wall surface 48D. The first side wall surface 48A and the second side wall surface 48B are opposed to each other. The third side wall surface 48C and the fourth side wall surface 48D are opposed to each other. In the present embodiment, the first side wall surface 48A and the second side wall surface 48B are formed to extend in the longitudinal direction of the battery unit 30. However, there is no limit to such an arrangement, and the recess 40 can be arranged in any manner relative to the battery unit 30. In the present embodiment, the first side wall surface 48A and the second side wall surface 48B are substantially parallel to each other, and the third side wall surface 48C and the fourth side wall surface 48D are substantially parallel to each other. In a further embodiment, the first side wall surface 48A and the second side wall surface 48B can approach each other from the opening 46 toward the bottom surface 44, and/or the third side wall surface 48C and the fourth side wall surface 48D can approach each other from the opening 46 toward the bottom surface 44.

The steps 42 are formed so that the bottom surface 44 of the recess 40 has a smaller area than the opening 46 of the recess 40. The steps 42 include a first step 42A, a second step 42B and a third step 42C.

The first step 42A and the second step 42B are located at opposite sides of the bottom surface 44. The first step 42A is continuous with the first side wall surface 48A. Further, the first step 42A is located between the third side wall surface 48C and the fourth side wall surface 48D. The second step 42B is continuous with the second side wall surface 48B. The first step 42A is located toward the bottom surface 44 from the opening 46. The first step 42A includes a first step surface 42A1 and a second step surface 42A2. The first step surface 42A1 is opposed to the opening 46. The second step surface 42A2 extends toward the bottom surface 44 from the end of the first step surface 42A1 that is closer to the second step 42B. The second step 42B is located toward the bottom surface 44 from the opening 46. The second step 42B includes a first step surface 42B1 and a second step surface 42B2. The first step surface 42B1 is opposed to the opening 46. The second step surface 42B2 extends toward the bottom surface 44 from the end of the first step surface 42B1 that is closer to the first step 42A. The second step surface 42B2 is continuous with the third step 42C. The second step surface 42A2 of the first step 42A opposes the second step surface 42B2 of the second step 42B. The third step 42C is located between the second step 42B and the bottom surface 44. The third step 42C includes a first step surface 42C1 and a second step surface 42C2. The first step surface 42C1 is opposed to the opening 46. The first step surface 42C1 is continuous with the second step surface 42B2 of the second step 42B. The second step surface 42C2 extends toward the bottom surface 44 from the end of the first step surface 42C1 that is closer to the first step 42A. The second step surface 42C2 is continuous with the bottom surface 44. The second step surface 42C2 of the third step 42C opposes the second step surface 42A2 of the first step 42A. It is preferred that the first step surfaces 42A1, 42B1 and 42C1, the second step surfaces 42A2, 42B2 and 42C2, and the bottom surface 44 be substantially flat. Further, it is preferred that the first step surface 42A1 of the first step 42A and the first step surface 42B1 of the second step 42B substantially lie along the same plane. In a further embodiment, the distance of the first step surface 42A1 of the first step 42A from the opening 46 can differ from the distance of the first step surface 42B1 of the second step 42B from the opening 46. In the present embodiment, the second step surface 42A2 is substantially parallel to the second step surfaces 42B2 and 42C2. In a further embodiment, the second step surface 42A2 and the second step surfaces 42B2 and 42C2 extend from the opening 46 toward the bottom surface 44. One of the first step 42A and the second step 42B can be omitted from the step 42. Further, the third step 42C can be omitted. A socket for the electric connector 82 is exposed from the bottom surface 44 to a space S defined by the recess 40 or projected from the bottom surface 44 toward the opening 46.

The coupling portion 60 is attached to the steps 42. Among the steps 42, the coupling portion 60 is attached in a removable manner to the first step 42A and the second step 42B. The coupling portion 60 is arranged on the first step surface 42A1 of the first step 42A and the first step surface 42B1 of the second step 42B. The first step 42A and the second step 42B each include a threaded hole 43. The threaded holes 43 have an opening in the corresponding first step surface 42A1 and first step surface 42B1. The coupling portion 60 is attached by the screws 64 and the threaded holes 43 to the first step 42A and the second step 42B. The coupling portion 60 can be attached in a removable manner to only one of the first step 42A and the second step 42B. In this case, the threaded hole 43 is formed in only one of the first step 42A and the second step 42B. The threaded holes 43 can be omitted when adhering or welding the coupling portion 60 to the steps 42 in a non-removable manner.

The engagement portions 70 are located between the opening 46 and the first step surface 42A1 of the first step 42A and between the opening 46 and the first step surface 42B1 of the second step 42B. An engagement portion 70 can be arranged only between the opening 46 and the first step surface 42A1 of the first step 42A or only between the opening 46 and the first step surface 42B1 of the second step 42B. The engagement portions 70 are coupled by the screws 64 and the threaded hole 43 to the first step 42A and the second step 42B. The coupling portion 60 and the engagement portions 70 are formed integrally with one another. Thus, the attachment of the coupling portion 60 to the step 42 attaches the engagement portions 70 to the step 42. The coupling portion 60 can be formed separately from the engagement portions 70. In case the coupling portion 60 and the engagement portions 70 are formed separately, through holes that receive screws are respectively formed in the engagement portions 70 and the coupling portion 60, and corresponding threaded holes are respectively formed in the first step 42A and the second step 42B.

As shown in FIG. 3, the cover 50 includes a first portion 52 and a second portion 54. The cover 50 further includes first protrusions 56 that engage the engagement portions 70. The first portion 52, the second portion 54, and the first protrusions 56 are formed integrally with one another. It is preferred that the cover 50 be formed from a resin. In the example shown in FIG. 3, the number of the first protrusions 56 is two. In a further example, the number of protrusions is one or at least three. The first portion 52 is formed to be able to close the opening 46 of the recess 40. The first portion 52 includes a first surface 52A. In a state in which the cover 50 is attached to the base 34 to cover the recess 40, the surface of the first portion 52 opposite to the first surface 52A contacts the retainer 66. The second portion 54 extends from the first portion 52 in a depth-wise direction of the recess 40. The second portion 54 is configured to be insertable into the through hole 66A of the retainer 66. In a state in which the cover 50 is coupled to the base 34 to cover the recess 40, it is preferred that the second portion 54 extend through the through hole 66A. In a state in which the cover 50 is attached to the base 34 to cover the recess 40, the second portion 54 can contact the first step surface 42C1 of the third step 42C. The second portion 54 can be configured to contact the peripheral surface of the retainer 66 in a state in which the cover 50 is attached to the base 34 to cover the recess 40. The first protrusions 56 are arranged on the second portion 54. Further, the first protrusions 56 outwardly protrude from the side surface of the second portion 54. The present embodiment includes two first protrusions 56 that protrude from the second portion 54 away from each other in the first direction X. As long as the first protrusions 56 are configured to protrude toward the retainer 66 in a state in which the cover 50 is attached to the base 34 to cover the recess 40, the first protrusions 56 can protrude in a direction intersecting the first direction X. The cover 50 is coupled to the coupling portion 60 in a non-removable manner. The cover 50 further includes a coupled portion 50C. The coupled portion 50C is annular and allows for the insertion of the coupling pin 60A. In a state in which the coupling pin 60A is inserted into the coupled portion 50C, the coupling pin 60A is non-removably fixed to the coupled portion 50C in a non-removable manner. It is preferred that the hole of the coupled portion 50C that receives the coupling pin 60A be elongated. The hole of the coupled portion 50C that receives the coupling pin 60A can be circular and have generally the same diameter as the coupling pin 60A. It is preferred that the coupled portion 50C be elastic. It is preferred that the coupled portion 50C be arranged on the end of the cover 50 that differs from the end on which the tab 50B is arranged in the first direction X.

Figure 6:
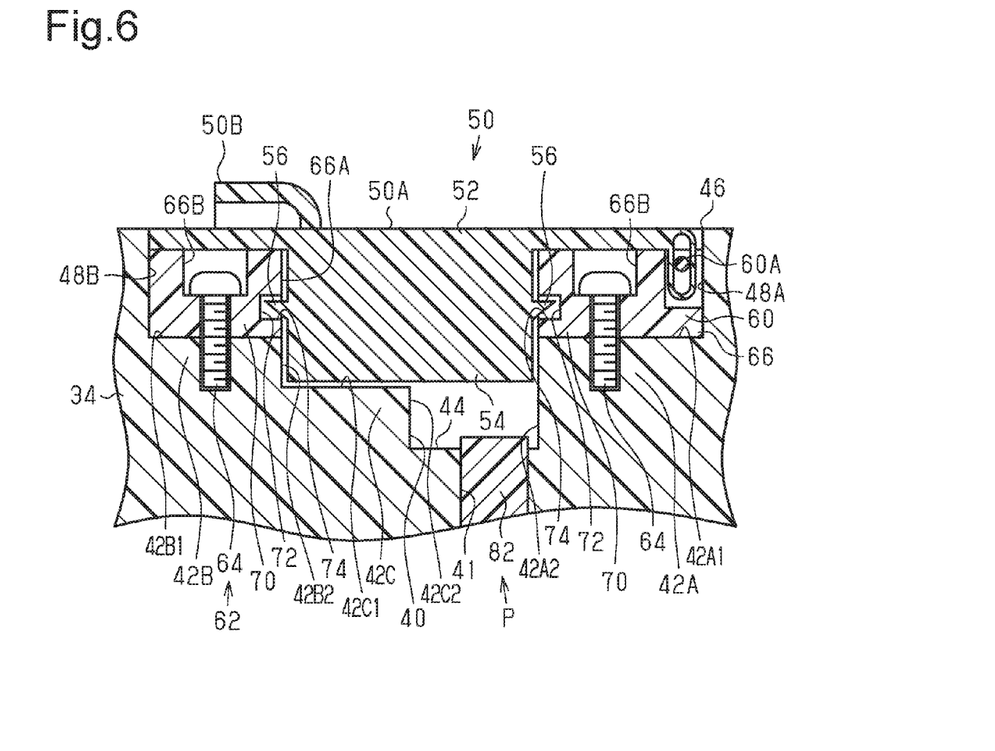
FIG. 6 is a cross-sectional view of the portion of the bicycle component around the cover as seen along section line 6-6 in FIG. 6.

As shown in FIG. 6, the engagement portions 70 each include a first groove 72. The first groove 72 is configured to allow the insertion of the corresponding first protrusion 56 of the cover 50. The first grooves 72 open in a direction that intersects the depth-wise direction of the recess 40. Preferably, the first grooves 72 are open in a direction orthogonal to the depth-wise direction of the recess 40. The first grooves 72 are in communication with the through hole 66A of the retainer 66. The engagement portions 70 are located at opposite sides of the through hole 66A of the retainer 66. It is preferred that the engagement portions 70 be located proximate to the corresponding fasteners 62. In the present embodiment, the engagement portions 70 are each located between the through hole 66A of the retainer 66 and the corresponding fastener 62. This holds the engagement portions 70 on the base 34 in a further stable manner even if load is applied to the engagement portions 70 when coupling or removing the cover 50. The first protrusions 56 and the first grooves 72 form the engagement structure 74. When the cover 50 is attached to the base 34 to cover the recess 40, the first protrusions 56 are inserted into the first grooves 72. This engages the cover 50 with the engagement portion 70. When force is applied to the cover 50 in a direction that removes the cover 50 from the recess 40, the first protrusions 56 are disengaged from the engagement portion 70. This separates the cover 50 from the recess 40 and exposes the protected member P to the outside.

Modified Examples

It should be apparent to those skilled in the art that the present invention may be embodied in many other specific forms without departing from the spirit or scope of the invention. Particularly, it should be understood that the present invention may be embodied in the following forms.

The configuration of the protected member P can be changed in any manner. In one example, the protected member P is the key slot 24B. In this case, the key slot 24B is arranged in the recess 40 so that a key hole of the key slot 24B is exposed in the space S defined by the recess 40. The key slot 24B can be partially arranged in the interior of the housing.

Figure 7:
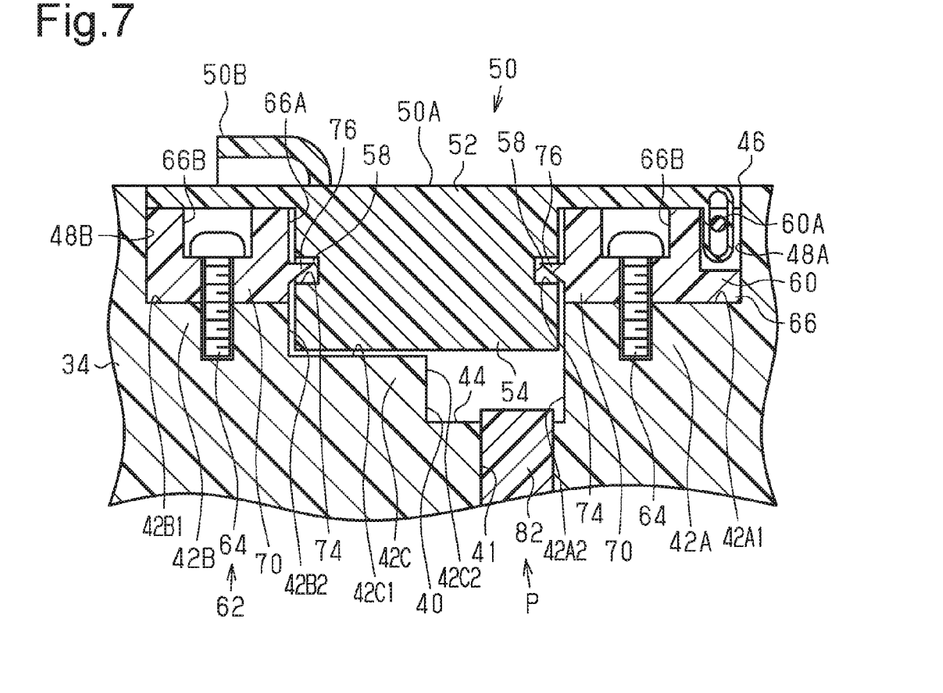
FIG. 7 is a cross-sectional view of a modified example of the portion of the bicycle component around the cover as seen along line 6-6 in FIG. 6.

The configuration of the engagement structure 74 can be changed in any manner. FIG. 7 shows a modified example of the engagement structure 74. The cover 50 includes a pair of second grooves 58. The engagement portions 70 include a pair of second protrusions 76. The second grooves 58 are configured to allow for insertion of the second protrusions 76 of the engagement portions 70. The second grooves 58 are located at where the first protrusions 56 are located in the above embodiment. The second protrusions 76 are located at where the first grooves 72 are located in the above embodiment. The second grooves 58 and the second protrusions 76 form the engagement structure 74. The insertion of the second protrusions 76 into the second grooves 58 engages the cover 50 with the engagement portion 70. The engagement portions 70 and the cover 50 can also be configured so that the engagement structure 74 shown in FIG. 6 is combined with the engagement structure 74 shown in FIG. 7.

The subject provided with the recess 40 and the cover 50 can be changed. In a first example, the recess 40 and the cover 50 are arranged in a bicycle component that is separate from the battery component 20. The separate bicycle component can be an electric assist unit, a cycle computer, an operation device, a gear changer, a suspension, or an imaging device. The operation device can be a gear changer operation device, a brake operation device, or an electric unit operation device. The gear changer can be a hub gear or a derailleur. In a second example, the recess 40 and the cover 50 are arranged on a bicycle body, for example, at least one of a frame, a front fork, a stem, a handlebar, a saddle, and a seatpost. The seatpost includes an adjustable seatpost. A third example is the battery holder 22. The housing 32 can accommodate a single battery cell.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated. Also, it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. Finally, terms of degree such as "substantially", "about" and "approximately" as used herein mean an amount of deviation of the modified term such that the end result is not significantly changed.

The foregoing descriptions of the embodiments according to the present invention are provided for illustration only, and not for the purpose of limiting the invention as defined by the appended claims and their equivalents.

What is claimed is:

1. A bicycle component comprising:
   a base including a recess having an opening on an exterior surface of the bicycle component;
   a cover selectively covering the opening of the recess;
   a protected member that is at least partially arranged in the recess; and
   an engagement portion being configured separately from the cover and the protected member, the engagement portion being provided in the recess and engaging the cover that covers the recess.

2. The bicycle component according to claim 1, wherein the protected member is an electric connector or a key slot.

3. The bicycle component according to claim 1, wherein the engagement portion is removably fixed to the base.

4. A bicycle component comprising:
a base including a recess;
a cover selectively covering the recess;
a protected member that is at least partially arranged in the recess;
an engagement portion being configured separately from the cover and the protected member, the engagement portion being provided in the recess and engaging the cover that covers the recess; and
a coupling portion to which the cover is movably coupled, the coupling portion being attached to the base in the recess.

5. The bicycle component according to claim 4, wherein
the base includes a bottom surface, a step and an opening at least partially defining the recess, the bottom surface of the recess has a smaller area than the opening of the recess; and
the coupling portion is attached to the step.

6. The bicycle component according to claim 4, wherein the coupling portion is formed integrally with the engagement portion as a one-piece member.

7. The bicycle component according to claim 4, wherein the cover is non-removably coupled to the coupling portion.

8. The bicycle component according to claim 4, further comprising
a fastener that removably fixes the coupling portion to the base.

9. The bicycle component according to claim 8, wherein the fastener includes a screw.

10. A bicycle component comprising:
a base including a recess;
a cover selectively covering the recess;
a protected member that is at least partially arranged in the recess;
an engagement portion being configured separately from the cover and the protected member, the engagement portion being provided in the recess and engaging the cover that covers the recess; and
the cover includes a first protrusion that engages the engagement portion.

11. The bicycle component according to claim 10, wherein
the cover includes a first portion that covers an opening of the recess and a second portion that extends in a depth-wise direction of the recess; and
the first protrusion is provided on the second portion.

12. The bicycle component according to claim 10, wherein
the engagement portion includes a first groove that engages the first protrusion.

13. The bicycle component according to claim 12, wherein
the cover includes a second groove that engages the engagement portion.

14. The bicycle component according to claim 1, further comprising
a housing that is at least a portion of the base.

15. The bicycle component according to claim 14, further comprising
a battery cell accommodated in the housing.

* * * * *